United States Patent

[11] 3,561,483

| [72] | Inventor | John F. Taplin<br>15 Sewall St., West Newton, Mass. 02165 |
|---|---|---|
| [21] | Appl. No. | 849,592 |
| [22] | Filed | Aug. 6, 1969 |
| [45] | Patented | Feb. 9, 1971 |
| | | Continuation of application Ser. No.<br>596,911, Nov. 25, 1966, now abandoned. |

[54] DUAL FLUID MIXING VALVE WITH SERVOMOTOR
4 Claims, 9 Drawing Figs.

[52] U.S. Cl.............................................. 137/625.4,
236/12; 251/282; 137/90
[51] Int. Cl.................................................F16k 11/02,
F16k 19/00
[50] Field of Search............................................ 137/90,
505.18, 625.4, 625.34, 625.5; 251/25, 30, 43—46;
236/12

[56] References Cited
UNITED STATES PATENTS

| 824,658 | 6/1906 | Junggren | 251/30 |
| 1,302,538 | 5/1919 | Gulick | 137/413 |
| 1,819,045 | 8/1931 | Snediker | 236/12 |
| 2,272,403 | 2/1942 | Fields | 236/12 |
| 2,449,766 | 9/1948 | Brown | 137/90X |
| 2,577,967 | 12/1951 | Hughes | 251/25 |
| 2,875,784 | 3/1959 | Cole | 137/625.5 |
| 3,087,675 | 4/1963 | Honegger | 251/282X |
| 3,177,892 | 4/1965 | Grandstaff | 251/282X |
| 3,304,048 | 2/1967 | Roberts | 251/282X |

FOREIGN PATENTS

| 818,042 | 6/1937 | France | 236/12 |
| 864,469 | 4/1961 | Great Britain | 236/12 |

*Primary Examiner*—Henry T. Klinksiek
*Attorney*—Erwin Salzer

ABSTRACT: A servo-controlled mixing valve for mixing two fluids in accordance with a variable ratio determined by the action of a sensing element includes a first valve element controlling the flow of a first fluid and a second valve element controlling the flow of a second fluid. Both valve elements are integral with a first common stem operated by a single fluid servomotor. A single pressure-balancing element integral with said first stem is under the action of said second fluid and precludes the transmission by the intermediary of said first stem of forces resulting from the action of said second fluid upon said second valve element to a partition of said single fluid servomotor. The forces resulting from the action of said first fluid upon said first valve element are transmitted to said partition of said single fluid servomotor by the intermediary of said first stem. The aforementioned fluid servomotor is operated by said first fluid and its operation is controlled by means which are a fluid equivalent of a voltage divider thus enabling to supply the fluid servomotor with any pressure down from the full supply pressure of said first fluid.

INVENTOR:
JOHN F. TAPLIN,
BY [signature] ATTORNEY

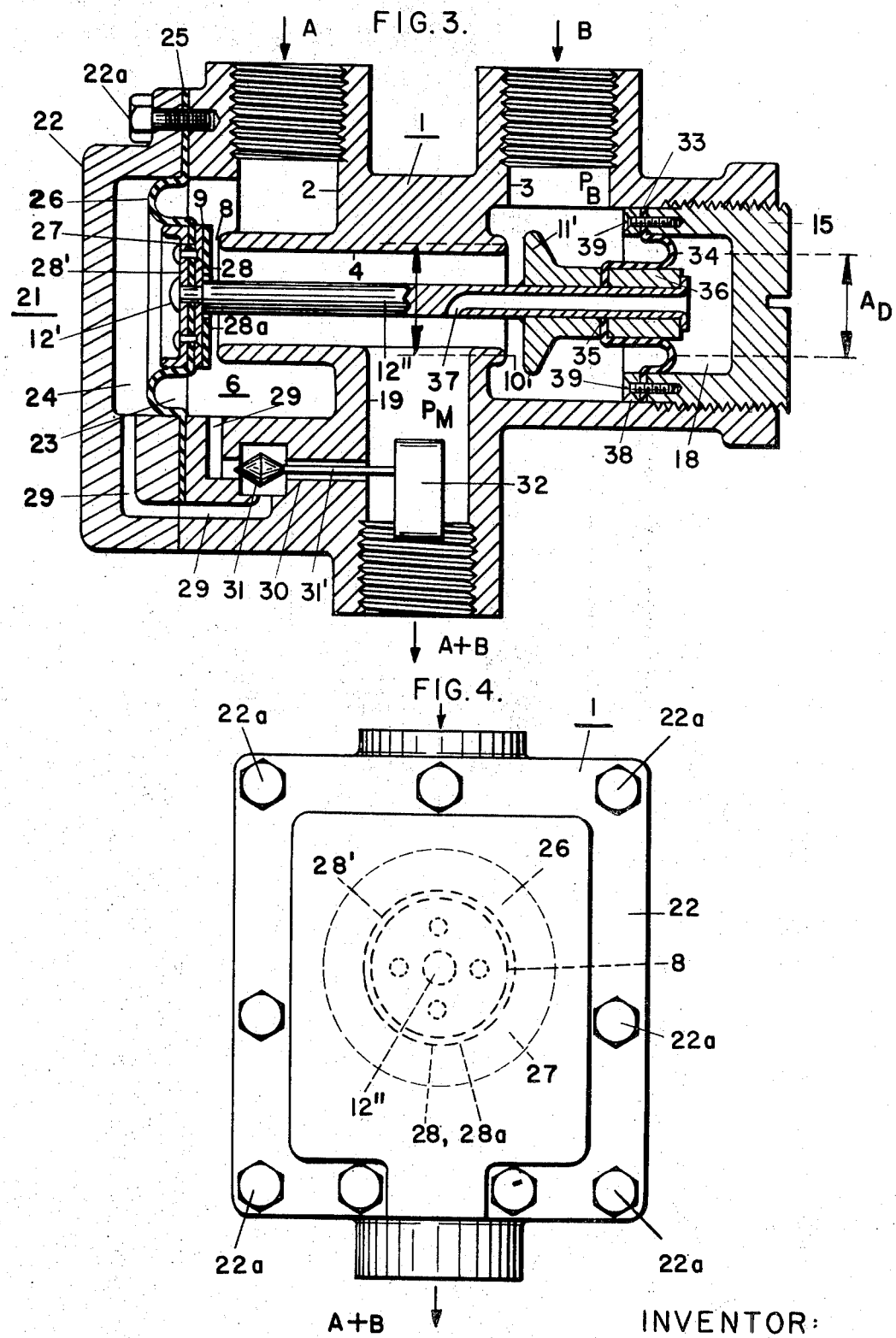

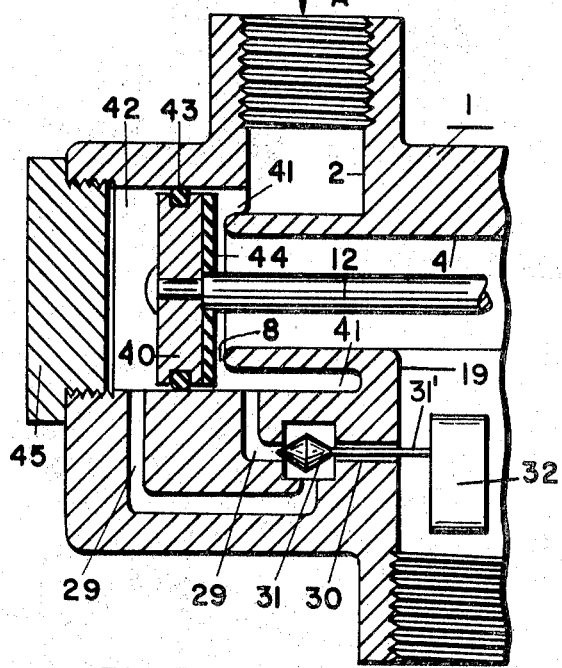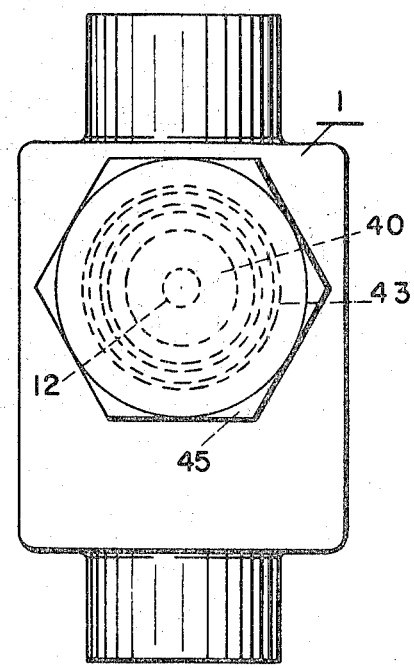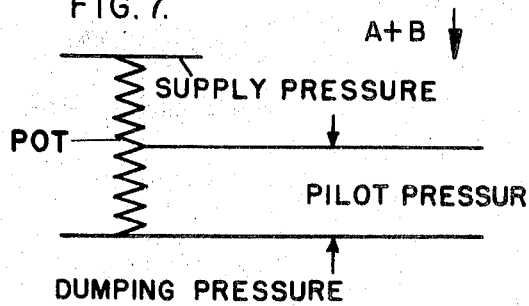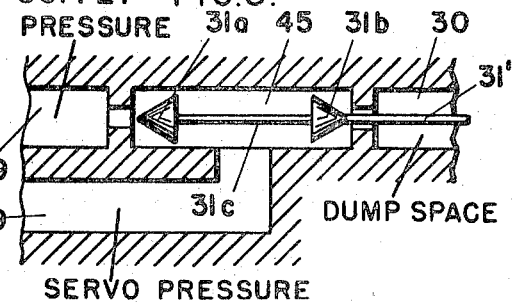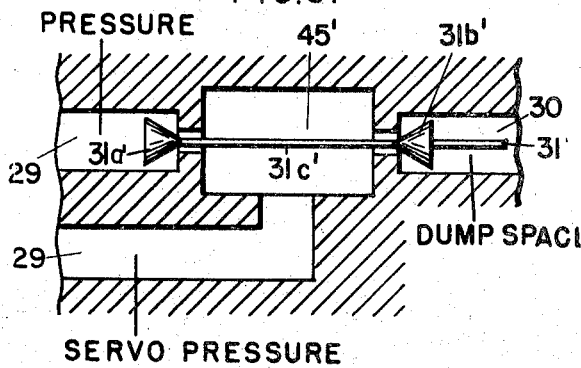
INVENTOR:
JOHN F. TAPLIN,
BY ATTORNEY 3,561,483

DUAL FLUID MIXING VALVE WITH SERVOMOTOR

This application is a continuation of application Ser. No. 596,911 filed Nov. 25, 1966, now abandoned.

For a better understanding of the invention, together with other objects and advantages thereof, reference may be had to the following description, taken in connection with the accompanying drawings, and its scope will be pointed out with particularity in the appended claims.

In the drawings:

FIG. 3 is substantially a longitudinal section of another mixing valve embodying this invention;

FIG. 4 is a side elevation of the structure of FIG. 3 seen from left to right of FIG. 3;

FIG. 5 is substantially a longitudinal section of a modification of the left portion of the structure shown in FIG. 1;

FIG. 6 is a side elevation of the structure of FIG. 5 seen from left to right of FIG. 5;

FIG. 7 shows the electric analogue of the servosystem shown in the preceding FIGS. and FIGS. 8 and 9 are diagrammatic illustrations of modifications of the servo control system illustrated in the preceding FIGS.

Figure 1:
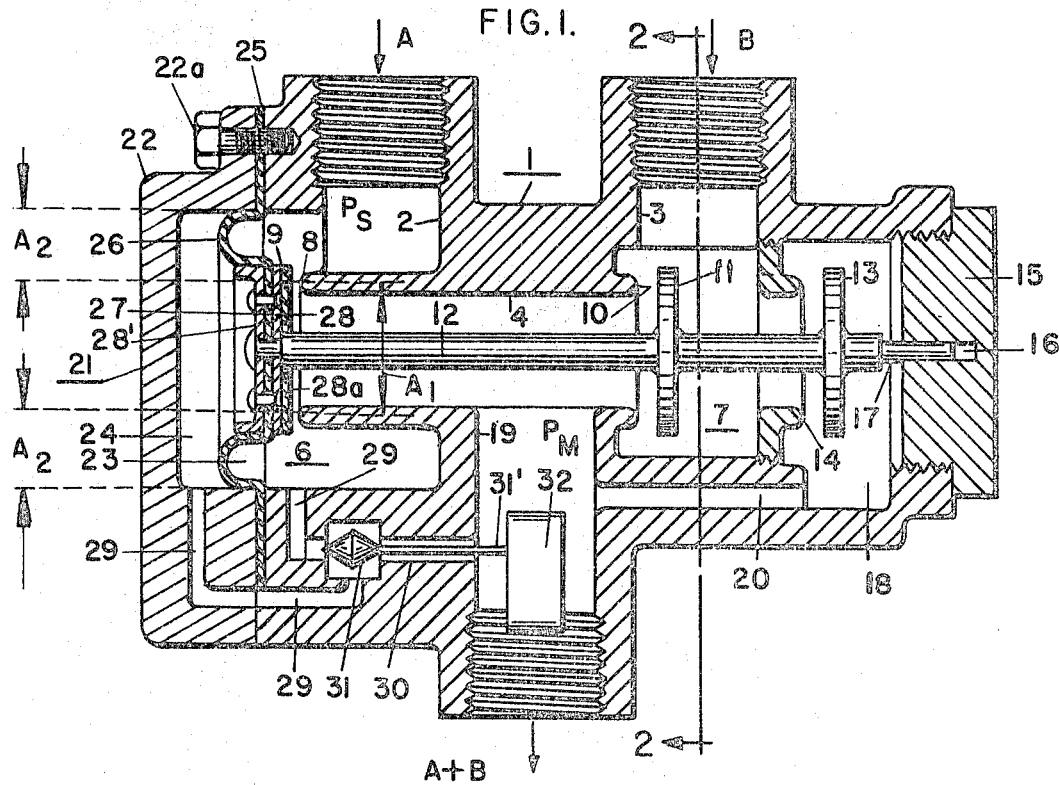
FIG. 1 is substantially a longitudinal section of a mixing valve embodying this invention, some parts being shown in elevation rather than being sectionalized.
Figure 2:
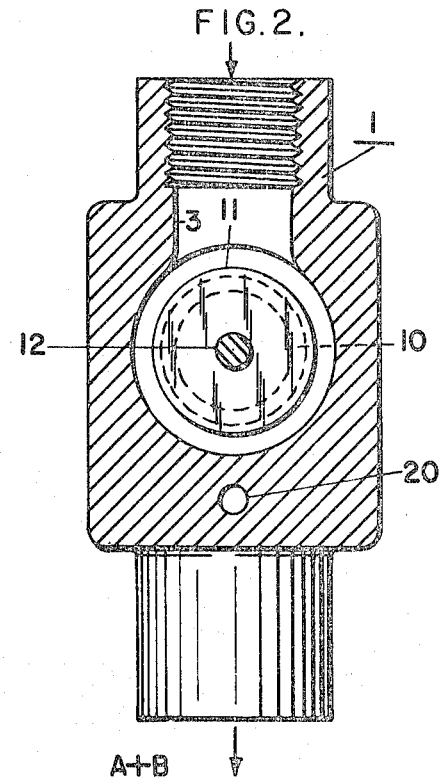
FIG. 2 is a section a taken along 2-2 of FIG. 1.

Referring now to the drawings, and more particularly to FIGS. 1 and 2 thereof, reference numeral 1 has been applied to generally indicate a casting member defining a first passageway 2 for a first fluid indicated by the arrow A, and further defining a second passageway 3 for a second fluid indicated by the arrow B. Reference numeral 4 has been applied to indicate a mixing chamber for fluids A and B. A first valve means generally indicated by the reference character 6 controls the admission of fluid A from passageway 2 to mixing chamber 4, and a second valve means generally indicated by reference character 7 controls the admission of fluid B from passageway 3 to mixing chamber 4. Valve means 6 includes a fixed valve seat 8 and a movable valve element 9 cooperating with valve seat 8. When valve element 9 is moved from right to left, as seen in FIG. 1, valve element 9 increases the gap formed between parts 8 and 9, and hence the admission of fluid A from passageway 2 to mixing chamber 4. When valve element 9 is moved from left to right, as seen in FIG. 1, valve element 9 decreases the gap formed between parts 8 and 9, and hence the admission of fluid A from passageway 2 to mixing chamber 4. Valve means 7 includes a fixed valve seat 10 and a movable poppet type valve element 11 cooperating with valve seat 10. When valve element 11 is moved from right to left, as seen in FIG. 1, valve element 11 decreases the gap formed between parts 10 and 11, and hence the admission of fluid B from passageway 3 to mixing chamber 4, and when valve element 11 is moved from left to right, as seen in FIG. 1, it increases the gap formed between parts 10 and 11, and hence the admission of fluid B from passageway 3 to mixing chamber 4. In other words, valve element 9 and 11, when moved in the same direction, change inversely the amounts of fluids A and B admitted to mixing chamber 4. Valve element 9 and 11 are mounted on a common valve stem which extends to the right beyond valve element 11, as seen in FIG. 1, and supports an additional valve element or pressure-balancing element 13 cooperating with fixed valve seat 14. Casting member 1 is closed on the right end thereof by an externally secrew-threaded plug 15 having a central bore 16. Bore 16 forms a slide bearing for the right reduced diameter portion 17 of stem 12. The mixing chamber 4 situated to the right of valve element 9, and to the left of valve element 11, communicates with a passageway 19 defined by casting member 1 for draining the mixture of fluids A and B from mixing chamber 4. Reference numeral 20 has been applied to indicate a duct defined by casting member 1 which connects space 18 situated to the right of valve element or pressure-balancing element 13, and to the left of plug 15, and passageway 19.

Reference numeral 21 has been applied to generally indicate a common fluid servomotor for operating valve elements 9, 11 and 13. Servomotor 21 includes a cylinder body 22 formed by a cap screwed by a plurality of screws 22a—of which but one is shown in FIG. 1—against the left end of casting member 1, as seen in FIG. 1. A partition movable inside of cylinder body 22 subdivides the cylinder body 22 into a first chamber 23 arranged in close proximity to passageway 2, directly communicating with passageway 2, and directly supplied with fluid passageway from passageway 2, and into a second chamber 24. The aforementioned second chamber 24 is arranged more remotely from passageway 2 than chamber 23. In the embodiment of the invention the aforementioned partition is formed by a single rolling diaphragm. This rolling diaphragm includes a radially outer clamping flange 25, a convoluted rolling wall 26 and a radially inner clamping flange 27. The radially outer clamping flange 25 is clamped between casting member 1 and cylinder body 22 and the radially inner clamping flange 27 is clamped between a pair of relatively stiff plates 28 and 28'' which may be held together by appropriate fasteners as, for instance, the rivets shown in FIG. 1. The plates 28, 28' are coextensive with clamping flange 27 of rolling diaphragm 25, 26, 27. Plate 28 is covered with a coextensive plate 28a of a relatively soft and resilient material, e.g. rubber, intended to engage valve seat 8 when fluid A is to be completely shut off from mixing chamber 4. Plates 28 and 28a form or constitute the aforementioned valve element 9, and the left end of stem 12 is affixed to parts 27, 28, 29.

The structure of FIGS. 1 and 2 further includes servo control means for controlling the pressure in the aforementioned second chamber 24. These control means include portions of casting member 1 defining restricted ducts or passageways 29 and 30. Servo duct 29 admits fluid A from passageway 2 to chamber 24, and servo duct 30 dumps fluid from chamber 24 and from passageway 29 to passageway 19 which is a zone of relatively lower pressure. The means defining servo passageways 29 and 30 are arranged in fixed relation to the means defining passageways 2 and 3, and defining mixing chamber 4. Restricted servo passageways 29 and 30 are under the control of movable servo element means formed by a double cone-shaped servo-valve element structure 31. The left hand side of servo-valve element structure 31 controls the effective area of servo passageway 29, and thus the amount of fluid A admitted from passageway 2 to chamber 24. The right hand side of servo-valve element structure 31 controls the effective area of servo passageway 30, and thus the amount of fluid A drained from chamber 24. Servo-valve element structure 31 is supported by a valve stem 31' adapted to be moved in a direction longitudinally thereof by a sensing element 32. The latter may be a thermostat, either of the bimetal type, or the Bourdon tube type, or any other kind of sensing element, e.g. one sensitive to pH values. When stem 31' is moved from left to right, as seen in FIG. 1, under the action of sensing element 32, the effective cross-sectional area of servo passageway 29 is increased and the effective cross-sectional area of servo passageway is decreased. Hence the pressure in chamber 24 is increased and valve elements 9 and 11 moved from left to right. This in a relative decrease of the amount of fluid A admitted from passageway 2 to mixing chamber 4, and a relative increase in the amount of fluid B admitted from passageway 3 to mixing chamber 4. If stem 31' and structure 31 are moved from right to left under the action of sensing element 32, the effective area of servo passageway 29 is decreased and the effective area of servo passageway 30 increased. Therefore the pressure in chamber 24 is decreased and valve element 9 and 11 moved from right to left. This results in a relative increase of the amount of fluid A admitted from passageway 2 to mixing chamber 4, and in a relative decrease of the amount of fluid B admitted from passageway 3 to mixing chamber 4.

The pressure of fluid B on valve element 11, and 13 is equal, but opposite. Valve element 13 is, therefore, a valve balancing means precluding the transmission of forces resulting from the action of fluid B upon valve element 11 to the rolling diaphragm structure 25, 26, 27, or like movable partition means for cylinder body 22.

In FIG. 1 the annular gap formed between valve element 9 and valve seat 8 has been shown as being relatively large. The same applies to the illustration of the annular gaps between valve element 11 and valve seat 10, and valve element 13 and valve seat 14. Actually these gaps are very small, or narrow, and they have been shown overdimensioned in FIG. 1 for the purpose of greater clarity. The narrowness of the annular gap formed between parts 8 and 9 results in a drastic decrease of the pressure of medium A flowing from passageway 2 to mixing chamber 4, and the narrowness of the annular gap formed between parts 10 and 11 results in a drastic decrease of the pressure of medium B flowing from passageway 3 to mixing chamber 4. Therefore the pressure prevailing in mixing chamber 4 will always be much less than the pressure $P_S$ prevailing in passageway 2. The pressure prevailing in passageway 19 will be approximately equal to the low pressure prevailing in mixing chamber 4, and thus passageway 19 will be a low-pressure zone appropriate for dumping fluid from chamber 24 and passageway 29, respectively.

Let $A_1$ be the area of valve seat 8, and $A_2$ be the annular area indicated in FIG. 1, and let $P_s$ be the supply pressure of medium A and $P_M$ be the pressure prevailing in mixing chamber 4, and then the following force equations may be written $$F_1 = (A_1 + A_2) PS \quad (1)$$

wherein $F_1$ is the force action on unit 9, 25, 26, 27 from left to right, assuming that the double cone 31 has been moved a so far to the right that the supply pressure $P_S$ prevails in chamber 24.

$$F_2 = A_1 P_M + A_2 P_S 10 \quad (2)$$

wherein $F_2$ is the force acting on unit 9, 25, 26, 27 from right to left.

$$F_1 - F_2 =_1 P_S + A_2 PS - A_1 P_M - A_2 PS = A. (P_S - P_M) \quad (3)$$

It follows from equation (3) that the force from left to right is proportional to the difference of the supply pressure and the pressure of the mixture of media A and B in mixing chamber 4. It will be apparent from FIG. valve-element-forming that the spacing of valve element 11 from the valve-element-forming surface 28a exceeds the spacing between valve seats 8 and 10, this being a prerequisite for any motion of stem 12 in a direction longitudinally thereof, In FIGS. 3 and 4 the same reference characters as in FIGS. 1 and 2 have been applied to indicate like parts, and the left portion of the structure of FIG. 2 is identical to the left portion of FIG. 1. Therefore but the right portion of FIG. 3 requires additional description. Rolling diaphragm 33, 34, 35 thus preforms the same function as part 13 of FIG. 1, i.e. part 13 and part 33, 34, 35 are pressure-balancing elements. According to FIG. 3 the flow of fluid from passageway 3 to mixing chamber 4 is controlled by a valve including valve seat 10' defined by casting member 1 and including movable valve element 11' mounted on stem 12''. Reference numerals 33, 34, 35 have been applied to indicate a rolling diaphragm provided for the purpose of balancing the thrust directed from right to left by medium or gas B upon valve element 11'. The aforementioned rolling diaphragm 33, 34, 35 includes the radially outer clamping flange 33, the U-shaped rolling wall 34 and the radially inner clamping flange 35. The latter is clamped between an annular right end surface of valve element 11' and at the left annular end surface of a clamping member 36 mounted on, and supported by, stem 12''. The right end of stem 12'' is hollow and defines a passageway 37 which establishes a communication between space 18 situated to the left of plug 15 and mixing chamber 4. As a result of the provision of passageway 37 which establishes a communication between space 18 situated to the left of plug 15 and mixing chamber 4. As a result of the provision of passage 37 the pressure prevailing in chamber 18 will always be relatively low. The right end of stem 12'' is upset to maintain clamping member 36 in position, and to apply the proper clamping pressure on the radially inner clamping flange 35 of rolling diaphragm 33, 34, 35. The radially outer clamping flange 33 of rolling diaphragm 33, 34, 35 is clamped against the left annular end surface of plug 15 by means of a clamping ring 38. Screws 39 project transversely through clamping ring 38 into plug 15, thus maintaining the proper clamping pressure upon the radially outer clamping flange 33 of rolling diaphragm 33, 34, 35. The effective area of rolling diaphrgam 33, 34, 35 is substantially equal to the effective area of valve element 11', thus precluding the transmission of forces resulting from the action of fluid or gas B upon valve element 11' to the valve-element-rolling-diaphragm-unit 9, 25, 26, 27 by the intermediary of stem 12'' whose left end is affixed to that unit. The left end of stem 11'' is secured to the valve-element-rolling-diaphragm-unit 9, 25, 26, 27 by appropriate fastener means as for instance, the left end of shaft 12 may be upset in rivetlike fashion, as indicated at 12'. In the embodiment of the invention shown in FIG. 3 valve stem 12'' is not supported by any slide bearing means as shown in FIG. 1, but such means may be provided in any particular instance required requiring the presence of such means.

If $P_B$ is the supply pressure of the medium B and $P_M$ the pressure of media A and B prevailing in mixing chamber 4, $A_S$ the seat area of valve seat 10' and $A_D$ the effective area of rolling diaphragm 33, 34, 35, then the following equations may be established:

$$F3 = A_S(PB - 1 P_M) \quad (4)$$

$$F4 = A_D(PB - P_M) \quad (5)$$

wherein $F_3$ is the force acting on valve element 11' from right to left, and $F_4$ the force acting on rolling diaphragm 33, 34, 35 from left to right. If $$AS = A_D \quad (6)$$

the forces $F_3$ and $F_4$ are canceled, thus precluding any thrust by pressures $P_B$ and $P_M$ upon stem 12.

The area $A_S$ of valve seat 10' must be large in comparison to the area of the annular gap formed between valve seat 10' and valve element 11'.

Referring now to FIGS. 5 and 6, the right side of the structure of FIG. 5 which is broken away may be identical to the right side of the structure of FIG. 1, or to the right side of the structure of FIG. 3. In the structure of FIG. 5 the left end of stem 12 is secured to a piston 40 forming a movable partition between the two chambers 41 and 42 formed by casting member 1 and plug 45. Chamber 41 communicates directly with passageway 2, and is supplied with fluid or gas A from passageway 2. Piston 40 is provided with a circular groove on the lateral side thereof receiving an O-ring 43. The right side of piston 40 forms a valve element cooperating with valve seat 8. To this end the right side of piston 40 supports a layer 44 of soft resilient material as, for instance, vulcanized rubber. Fluid A is admitted from chamber 41 through passageway 29 to chamber 42, and fluid is dumped from chamber 42 and passageway 29 through passageway 30 ending in low-pressure passageway 19 by which mixing chamber 4 is being drained.

Valve structure 31 is in the shape of a double cone controls the effective minimum cross-sectional areas of both servo passageways 29 and 30.

Plug 45 closing the left side of casting member 1 includes an axially inner screw-threaded portion engaging a mating screw thread in casting member 1, and an axially outer portion, not projecting into casting member 1, which is of hexagonal shape.

In the structure of FIGS. 5 and 6 piston 40 and layer 44 take the place of parts 9, 25, 26, 27 of FIGS. 1 and 3, layer 44 cooperating with valve seat 8 to define circular gaps of varying width for the flow of fluid A from passageway 2 into mixing chamber 4.

Referring now to FIG. 7, this figure shows that the servo valves of FIGS. 1, 3 and 5 operate in the fashion of a potentiometer, they are an analogue of a potentiometer in an electric circuit. The supply pressure in passageway 2 corresponds to the voltage prevailing on one side of a potentiometer POT, and the dumping pressure prevailing in passageway 19 corresponds to the voltage prevailing on the other side of potentiometer POT. The pressure indicated in FIG. 7 as pilot pressure and which may also be referred to as servo pressure is determined by the position of structure 31 in the shape of a double cone, and it can take any desired value between the supply pressure and the dumping pressure. As mentioned above, the term pilot pressure is used in FIG. 7 as synonymous with servo pressure, i.e. the pressure prevailing in chamber 24 of the structure of FIGS. 1 and 3, and in chamber 42 of the structure of FIG. 5.

Referring now to FIG. 8, this FIG. shows a servo valve which is the equivalent of that shown in FIGS. 1, 3 and 5. According to FIG. 8 the double cone shaped structure 31 of FIGS. 1, 3 and 5 has been replaced by a pair of spaced coneshaped servo-valve elements 31a and 31b. Servo valve elements 31a31b are joined by a common stem 31c to form an integral structure. The unit 31a,31b,31c may be operated by a stem 31' in a direction longitudinally of the latter. Stem 31' is intended to be operated by any kind of appropriate sensing element as, for instance, a thermostat. Servo-valve elements 31a and 31b and valve stem 31c are arranged in a common chamber to which fluid A of FIGS. 1, 3 and 5 may be admitted in through servo passageway 29 defining an orifice the effective cross-sectional area of which is controlled by valve element 31a. The servo passageway 30 is a zone of relatively low pressure and communicates with chamber 45 by an orifice, the effective cross-sectional area of which is controlled by servo-valve element 31b. The portion of passageway 29 labeled "Servo Pressure" connects chamber 45 to the cylinder space of the servomotor remote from passageway 2 for fluid A or, in other words, space 24 of FIGS. 1 and 3, or space 42 of FIG. 5. Movement of servo-valve elements 31a and 31b from left to right increases the effective area of the orifice cooperating with servo-valve element 31a and decreases the effective area of the orifice cooperating with servo-valve element 31b. As a result, the pressure in chamber 45 and in that portion of passageway 29 labeled "Servo Pressure" is increased. Moving of servo-valve elements 31a and 31b in the opposite direction results in a decrease of the pressure prevailing in chamber 45 and in that part of passageway 29 labeled "Servo Pressure."

Referring now to FIG. 9, the structure shown therein includes means defining a chamber 45' communicating by means of an upstream orifice with the portion of servo passageway 29 labeled "Supply Pressure" and communicating by means of a downstream orifice with servo passage 30 labeled "Dump Space" since it is a zone of relatively low pressure. The aforementioned upstream orifice, i.e. the effective cross-sectional area thereof, is controlled by the cone-shaped servo-valve element 31a', and the aforementioned downstream orifice, i.e. the effective cross-sectional area thereof, is controlled by cone-shaped servo-valve element 31b'. Servo-valve elements 31a' and 31b' are supported by a common valve stem 31c', and operated by a rod 31' movable either way in a direction longitudinally thereof. Movement of rod 31' from right to left increases the effective area of the upstream orifice cooperating with servo-valve element 31a' and decreases the effective area of the downstream orifice cooperating with servo-valve element 31b'. Thus the pressure in chamber 45' and in the portion of servo passageway 29 labeled "Servo Pressure" is increased. Joint movement of servo-valve elements 31a' and 31b' in the opposite direction results in a decrease of the pressure in chamber 45' and in that portion of servo passageway 29 labeled "Servo Pressure."

It will be apparent from the foregoing that the structures of FIGS. 8 and 9 have similar performance characteristics. They differ structurally from each other in that in the first mentioned structure the servo-valve elements 31a and 31b are arranged in common chamber 45, while while in the last mentioned structure servo-valve elements 31a' and 31b' are arranged outside of chamber 45' in upstream passageway 29 an downstream passageway 30, respectively. In the structure of FIG. 8 movement of the rod 31' from left to right results in a increase of the servo pressure and movement of rod 31 40 from right to left results in a decrease of the servo pressure. In the structure of FIG. 9 movement of rod 31' from left to right results in a decrease of the servo pressure and movement of ro 31' from right to left results in an increase of the servo pressure

I claim:

1. A servo-controlled fluid mixing valve for mixing tw fluids in accordance with a variable ratio determined by th action of a sensing element including:

a. means defining a substantially tubular mixing chambe having two juxtaposed ends, said two juxtaposed en defining a first valve seat and a second valve seat;

b. means defining a first passageway for admitting to sai mixing chamber a first fluid through one of said two ju taposed ends thereof;

c. means defining a second passageway for admitting to sa mixing chamber a second fluid through the other of sa two juxtaposed ends thereof;

d. a fluid servomotor including a cylinder body and a part tion movable inside said cylinder body an subdividing sa cylinder body into a first chamber in close proximity t and directly communicating with said first passagewa and a second chamber arranged relatively remote fro said first passageway, said partition having a first valve element-forming surface adjacent said mixing chambe and a second surface remote from said mixing chambe said first valve-element-forming surface cooperating wit said first valve seat to establish gaps of varying size therebetween to control the admission of said first flui from said first passageway to said mixing chamber by sai partition in the absence of an additional valve elemer cooperating with said first valve seat;

e. a main valve stem arranged in coaxial relation to said mi ing chamber having one end fixedly attached to said part tion and said valve-element-forming surface thereof t preclude relative axial movement between said mai valve stem and said valve-element-forming surface;

f. A valve element fixedly supported by said main valve ste to preclude relative axial movement between said mai valve stem and said valve element, said valve eleme cooperating with said second valve seat to establish ga of varying sizes therebetween to control the admission said second fluid from said second passageway to sa mixing chamber, and the spacing of said valve eleme from said first valve-element-forming surface differir from the spacing between said second valve seat and sa first valve seat;

g. A pressure-balancing element secured to said main val stem and under the action of said second fluid for balan ing the forces of said second fluid upon said valve ek ment; and h. servo control means for controlling the pressure prevai ing in said second chamber of said cylinder body, sai servo control means including means defining a serv pressure chamber, a first restricted duct means for ac mitting fluid from said first passageway to said servo pre sure chamber, a second restricted duct means for drai ing fluid from said servo pressure chamber to a low-pre sure zone, a third restricted duct means connecting sa second chamber of said cylinder body and said serv pressure chamber, and a pair of servo-valve elemen operated by a common servo-valve stem and arranged o said common servo-valve stem to inversely vary the effe tive area of said first restricted duct means and the effe tive area of said second restricted duct means.

2. A mixing valve as specified in claim 1 wherein said part tion includes a rolling diaphragm and a piston, said rollin diaphragm having a radially outer clamping flange, a rollin wall and a radially inner clamping flange, said radially inn clamping flange of said rolling diaphragm being secured to said piston, said piston having a planar end surface adjacent said mixing chamber cooperating with said first valve seat to establish therebetween gaps of varying sizes.

3. A servo-controlled fluid mixing valve for mixing two fluids in accordance with a variable ratio determined by the action of a sensing element including:
   a. means defining a substantially tubular chamber having two juxtaposed ends, said juxtaposed ends defining a first valve seat and a second valve seat;
   b. means defining a first passageway for admitting to said mixing chamber a first fluid through one of said two juxtaposed ends thereof;
   c. means defining a second passageway for admitting to said mixing chamber a second fluid through the other of said juxtaposed ends thereof;
   d. means defining a third passageway for draining from said mixing chamber mixtures of said first fluid and of said second fluid;
   e. a fluid servomotor arranged in coaxial relation to said mixing chamber and including a cylinder body and a partition movable inside said cylinder body and subdividing said cylinder body into a first chamber in close proximity to and directly communicating with said first passageway and a second chamber arranged relatively remote from said first passageway, said partition having a first planar valve-seat-forming surface adjacent said mixing chamber and a second surface remote from said mixing chamber, said first planar valve-seat-forming surface cooperating with said first valve set to establish gaps of varying sizes therebetween to control the admission of said first fluid from said first passageway to said mixing chamber by said partition in the absence of an additional valve element cooperating with said first valve seat;
   f. a main valve stem arranged in coaxial relation to said mixing chamber and having one end fixedly attached to said partition and said valve-element-forming surface thereof to preclude relative axial movement between said main valve set stem and said valve-element-forming surface;
   g. a valve element fixedly supported by said main valve stem cooperating with said second valve seat to establish gaps of varying sizes therebetween to control the admission of said second fluid from said second passageway to said mixing chamber, and the spacing of said valve element from said first valve-element-forming surface differing from the spacing between said second valve seat and said first valve seat;
   h. pressure-balancing means including a pressure-balancing rolling diaphragm having a radially inner clamping flange secured to said main valve stem and having a front surface under the action of said second fluid for balancing the forces of said second fluid upon said valve element;
   i. means defining a servo pressure chamber;
   j. means defining a first restricted duct for admitting fluid from said first passageway to said servo pressure chamber;
   k. means defining a second restricted duct for draining fluid from said servo pressure chamber into said third passageway;
   l. means defining a third restricted duct connecting said second chamber of said fluid servomotor to said servo pressure chamber;
   m. a sensing element in said third passageway;
   n. a servo stem operated in a direction longitudinally thereof by said sensing element; and
   o. a pair of cone-shaped servo-valve element supported by said servo-valve stem and arranged to vary inversely the effective area of said first restricted duct and the effective area of said second restricted duct in response to movement of said servo-valve stem.

4. a mixing valve as specified in claim 3 wherein said partition consists of a servomotor rolling diaphragm having a radially outer clamping flange, a rolling wall and a radially inner clamping flange, said radially inner clamping flange being sandwiched between a rear plate and a front plate, and said front plate cooperating with said first valve seat to establish therebetween gaps of varying sizes, and wherein said main shaft is hollow at the end thereof remote from said first valve seat and defines a duct extending from a point downstream of said second valve seat to a point behind the surface of said pressure-balancing rolling diaphragm under the action of said second fluid.